United States Patent [19]
Fikse

[11] 3,883,158
[45] May 13, 1975

[54] VEHICLE WITH STEERABLE REAR WHEELS

[75] Inventor: Tyman H. Fikse, Enumclaw, Wash.

[73] Assignee: Pointer-Willamette Trailer Co., Inc., Renton, Wash.

[22] Filed: July 29, 1974

[21] Appl. No.: 492,484

[52] U.S. Cl. .................. 280/404; 280/426
[51] Int. Cl. ............................. B62d 53/00
[58] Field of Search ......... 280/404, 81 R, 81 A, 426

[56] References Cited
UNITED STATES PATENTS

| | | | |
|---|---|---|---|
| 3,102,735 | 9/1963 | Bigge | 280/404 UX |
| 3,156,487 | 11/1964 | Bigge | 280/426 |

FOREIGN PATENTS OR APPLICATIONS

| | | | |
|---|---|---|---|
| 389,166 | 3/1933 | United Kingdom | 280/404 |
| 660,550 | 5/1938 | Germany | 280/404 |
| 923,827 | 2/1955 | Germany | 280/404 |
| 925,332 | 3/1955 | Germany | 280/404 |

Primary Examiner—Leo Friaglia
Attorney, Agent, or Firm—Seed, Berry, Vernon & Baynham

[57] ABSTRACT

A tractor supports an elongated load at one end with the load being supported at its rearward end by a carriage supported on the ground by stationary wheels and by an independently steerable set of trailing wheels. The only connection between the tractor and the carriage is the load. The load and the steerable trailing wheels are interconnected by an adjustable pivotal linkage which automatically steers the trailing wheels in response to relative rotational movement between the rearward end of the load and the carriage. The adjustment of the linkage can be made easily to change the turning radius of the vehicle for various sized loads.

4 Claims, 6 Drawing Figures

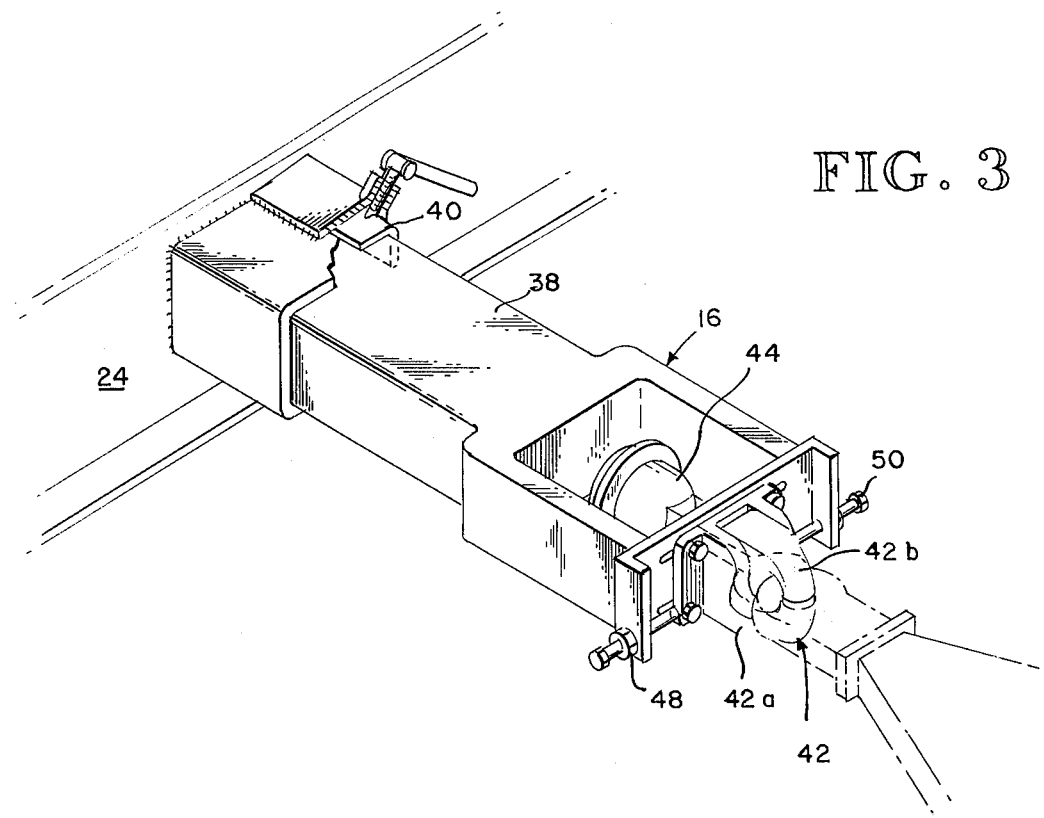
FIG. 3
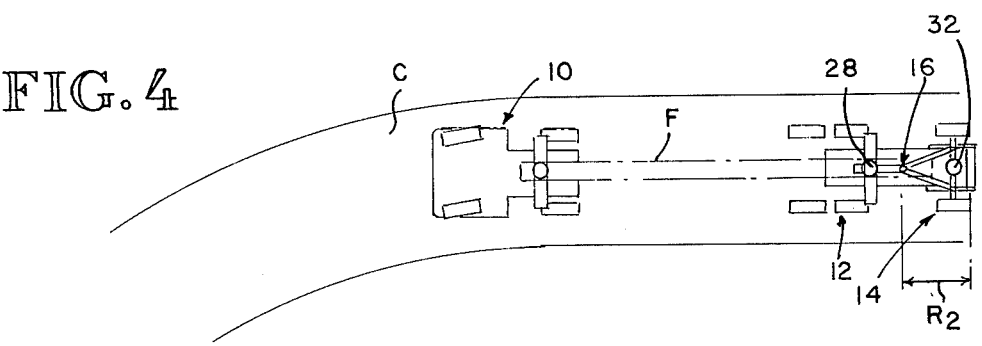
FIG. 4
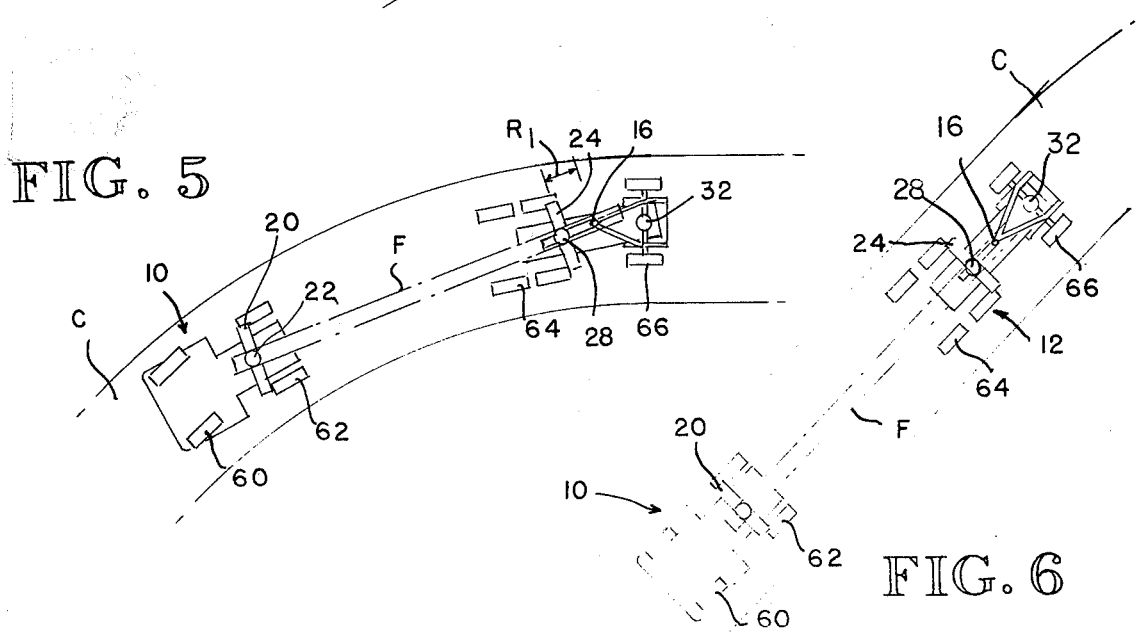
FIG. 5
FIG. 6

VEHICLE WITH STEERABLE REAR WHEELS

BACKGROUND OF THE INVENTION

1. Field of the Invention

This invention pertains to road vehicles and, more particularly, to extremely long vehicles having automatically steerable rear wheels.

2. Description of the Prior Art

It has long been a serious problem to haul extremely long loads or otherwise move extremely long vehicles over roads which have sharp, narrow curves. Some vehicles, such as hook-and-ladder fire trucks, employ a steering station at the rear of the vehicle with an operator to manually turn the rear wheels of the vehicle for negotiating turns. Other, somewhat smaller vehicles, such as logging trucks, have, in the past, employed a chain and sprocket drive between the tractor and independently steerable wheels on a trailer. Other vehicles have used hydraulic lines running between the tractor steering mechanism and the trailer steering mechanism to steer the trailing wheels in response to steering of the tractor wheels. While chain or hydraulic interconnections between the tractor and the trailer of vehicles are generally satisfactory for shorter vehicles or for vehicles used in relatively developed paved roads, they are generally costly to build and maintain for longer vehicles or for use in adverse conditions.

Various other techniques for automatically steering a rear set of wheels have been experimented with; however, none has been commercially feasible because of cost, complication of the steering mechanisms or the lack of adjustability necessary to make the steerable axle and steering mechanism standardized for different lengths and types of vehicles. One technique required two separate axles, each steerable independently in response to direction changes of the vehicle. Another technique employed a steerable axle forward of a rearward stationary axle and a complicated steering mechanism coupled to the vehicle frame, which made adjustment difficult.

SUMMARY OF THE INVENTION

It is an object of this invention to provide a vehicle for carrying extremely long loads over rough, narrow and twisting roads.

It is another object of this invention to provide a vehicle in which the rear steerable wheels are steered by the load or main frame carried on the vehicle.

It is another object of this invention to provide a vehicle in which the rear steerable wheels are steered by the main frame or load and in which adjustments can be readily made for varying the vehicle turning radius or accommodating various length vehicles.

It is still another object of this invention to provide a vehicle which is inexpensive to build and maintain for carrying loads in excess of 80 feet.

Basically, these objects are obtained by providing a vehicle, either of the type having a tractor and an independent trailer or of the type having a single elongated bed or main frame, with a set of independently steerable rear wheels. Also provided is a stationary set of rear wheels forward of the steerable rear wheels which support a carriage that carries the rear end of the load or main frame of the vehicle. Means are provided for adjustably interconnecting essentially any length load or main frame of a vehicle with the steerable rear wheels such that relative pivotal movement between the load or main frame and the carriage about a first vertical axis is transmitted to the rear steerable wheels for rotation about a second vertical axis so that the rear end of the elongated load or main frame is positively steered independently of the steering in the front end of the vehicle to change the effective turning radius of the vehicle.

As is readily apparent, the use of the main frame or load as the actuating force reduces the amount of linkage necessary to provide independent steering of the rear wheels. While the preferred embodiment of the invention provides a pivotal linkage between the load or main frame and the steerable rear wheels, it will be apparent that this linkage can be replaced by a parallelogram linkage, such as hydraulic cylinders or a chain and sprocket, without departing from the principle of steering the rear wheels from the load or main frame. The advantages of the invention can best be obtained by using the simple pivotal linkage illustrated as it provides quick adjustability and can be easily standardized for various length loads.

Suitable applications are for vehicles used to haul 80-foot sections of pipe, such as for pipeline construction in rough terrain in Alaska or other parts of the world, and for incorporation into vehicles such as elongated flatbed trucks.

BRIEF DESCRIPTION OF THE FIGURES OF THE DRAWING

FIG. 3 is a fragmentary isometric illustrating a portion of the steering or actuating mechanism employed in the vehicle of FIG. 1.

FIGS. 4, 5 and 6 are operational schematic illustrations showing the relative positions of steering between the forward wheels of the vehicle and the rearward wheels of the vehicle negotiating a tight curve.

DETAILED DESCRIPTION OF THE PREFERRED EMBODIMENTS

Figure 1:
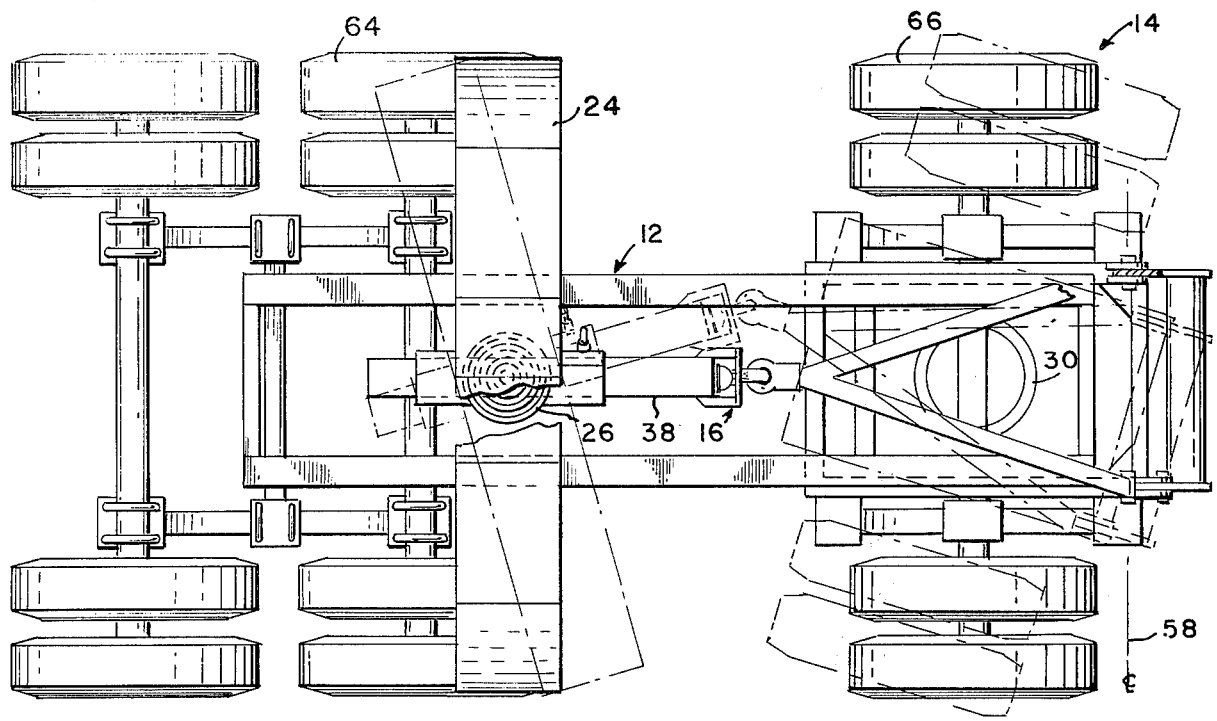
FIG. 1 illustrates a plan view of the rearward end of an elongated vehicle embodying the principles of the invention.

As best shown in FIG. 4, a suitable vehicle includes a tractor 10 supporting the front end of a main frame or load F and a carriage 12 supporting the rear end of the main frame or load F. While, in the preferred embodiment, the main frame will be illustrated as elongated pipe, the term "main frame" is to be used interchangeably with "load" so long as the load is of a type which is substantially rigid and can span the space between the tractor 10 and the carriage 12. It is understood, of course, that the load will be secured to the tractor and carriage to prevent relative longitudinal movement but, as will be herein described, will be free to pivot about vertical axes relative to the tractor and carriage.

The carriage 12 is also connected to a set of trailing wheels 14. Actuating means 16 interconnect the main frame F with the trailing wheels 14 in a manner such that relative pivotal movement between the carriage and the main frame will be transmitted into pivotal movement of the steerable wheels 14 via the actuating mechanism 16.

Figure 2:
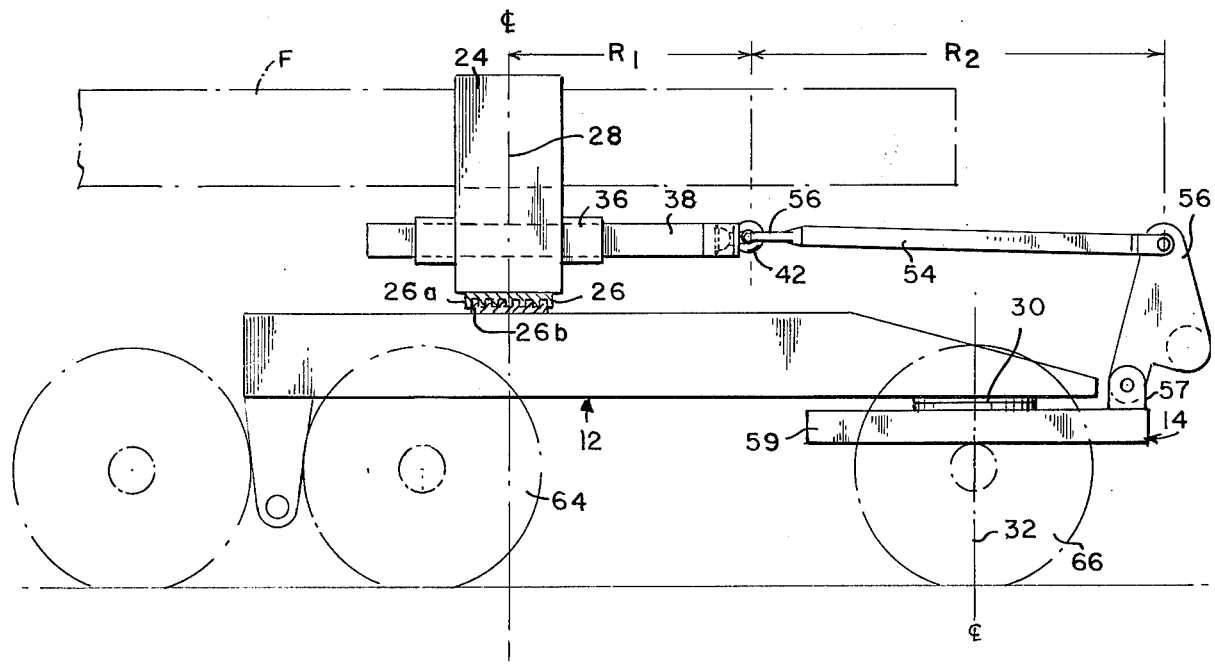
FIG. 2 is a side elevation of the vehicle shown in FIG. 1.

The main frame F is tightly secured to a forward load support or bunker 20 that is pivotally connected to the tractor 10 by a conventional turntable 22. The rearward end of the main frame is secured to a rearward load support or bunker 24 which is pivotally carried on the carriage 12 by a first bearing means or turntable 26. As is best shown in FIG. 2, the turntable 26 includes a plate having circular channels or rings 26a which are secured to the load support 24 and lower channels or rings 26b which are secured to the carriage 12. As is readily apparent, the rings 26a and 26b provide a pivotal connection between the load support 24 and the carriage but preclude relative longitudinal movement between the two. The rotational movement between the load support and carriage is about a first vertical axis 28.

The rear end of the carriage is provided with a second bearing means or turntable 30 of a conventional construction which interconnects the carriage to the set of trailing wheels 14 for rotational movement about a second vertical axis 32 while precluding relative longitudinal movement between the trailing wheels 14 and the carriage 12.

The load support 24 is provided with a rigid channel 36 that receives an extension arm 38. The extension arm can be adjusted longitudinally in the channel 36 and is locked in place by a conventional locking mechanism 40. The rearward end of the extension arm is provided with a hook 42 having a stationary lower member 42a and an upper member 42b. The upper member can be raised to open the hook and also is provided with an adjustment mechanism 44 of a conventional construction which will shift the upper member 42b longitudinally of the extension arm to enlarge or reduce the size of the hook so that end play can be reduced between the hook and the ring or eye that is secured in the hook. The hook is also provided with a lateral adjustment bracket 48 that is provided with adjustment bolts 50. Movement of the bolts 50 will shift the hook 42 laterally relative to the center line of the extension arm to shift the pivotal connection with the extension arm for providing better tracking of the trailing wheels 14, as will be described.

The actuating means 16 also includes a pivot arm 54 having an eye 56 positionable in the hook 42. The pivot arm in the preferred embodiment is V-shaped and is pivotally connected at the ends of the V to a vertical linkage 56. The vertical linkage 56 is pivotally connected on a pair of ears 57 for movement about a horizontal axis 58. The ears 57 are rigidly connected to an axle frame 59 which carries the trailing wheels 14. As is readily apparent, the linkage 56 can transmit rotational movement about the vertical axis 32 while moving forward and rearward longitudinally of the vehicle.

As is well understood, the tractor is supported by steerable wheels 60 and stationary wheels 62. The carriage is supported by stationary wheels 64 and the steerable trailing wheels 14. As best illustrated in FIGS. 4–6, movement of the steerable wheels 60 to turn the tractor on a curve C will cause the frame F to pivot about the first vertical axis 28. This will cause the extension arm 38 and its pivotal coupling 42 to rotate relative to the carriage 12. This position of rotation is best illustrated in phantom lines in FIG. 1. As the extension arm 38 pivots relative to the carriage, it draws the eye 56 of the pivot arm 54 laterally and forwardly. The lateral movement of the pivot arm 54 is transmitted to the axle frame 59 through the linkage 56. The axle frame 59 then rotates into the phantom line position shown in FIG. 1, causing the steerable wheels 14 to move the carriage in a lateral direction relative to the longitudinal center line of the main frame and, in effect, turning the carriage and end of the main frame about the forward turntable 22 on the tractor. This position is also best illustrated in FIG. 5 and results in the vehicle turning about a predictable effective turning radius about midway and lateral of the forward and rearward ends of the vehicle. As the tractor leaves the curve C, it again pivots the load about the first vertical axis 28, tending to restore the load to an aligned position with the carriage. This motion, in turn, is again transmitted to the steerable wheels 14, positively restoring the steerable wheels 14 to their normal, straight tracking position on the carriage.

As is readily apparent, all of the turning forces applied to the trailing wheels 14 are transmitted from the load or main frame F and bring about a condition in which the rearward end of the vehicle follows an independent path of travel, generally following the same path as the forward steerable wheels 60 on the tractor. As is also apparent, the steering of the rearward end of the vehicle is adjustable and enables virtually any length vehicle to negotiate tighter turns using a standardized rear steerable unit.

While the preferred embodiments of the invention have been illustrated and described, it should be apparent that variations will be apparent to one skilled in the art without departing from the principles herein. Accordingly, the invention is not be limited to the specific embodiment illustrated.

The embodiments of the invention in which a particular property or privilege is claimed are defined as follows:

1. An elongated vehicle comprising:
    A tractor having a main frame, at least two forward steerable wheels on said main frame, rearward carriage means having forward and rearward ends and wheels supporting the carriage on the ground, first bearing means for supporting said main frame on said carriage means for movement about a first vertical axis, a trailing frame rearward of said first bearing means, second bearing means for supporting said carriage means rearward end on said trailing frame for movement about a second vertical axis, at least two steerable wheels on said trailing frame, lengthwise adjustable actuating means coupled between said main frame and said trailing frame steerable wheels for steering said trailing frame wheels in response to horizontal rotational movement of said main frame relative to said carriage means about said first vertical axis whereby the trailing frame steerable wheels will steer said trailing frame to allow turning of the vehicle about smaller radii.

2. The vehicle of claim 1, said actuating means including a pivotal coupling joint to said main frame, pivot arm means pivotally joined to said pivotal coupling at one end, means joining the other end of the pivot arm means to said steerable wheels for fore and aft movement relative thereto whereby the pivot arm means can compensate for changing distances between said pivotal coupling and said trailing frame steerable wheels, and adjusting means for varying the distance between said pivotal coupling and said first vertical axis for varying the effective turning radius of the vehicle.

3. The vehicle of claim 1, said main frame including an elongated load and a set of forward and rearward load supports, said first bearing means joining said carriage means and said rearward load support, said actuating means including a rearwardly extending extension bar on said rearward load support and a pivot arm, coupling means pivotally connecting said pivot arm to said extension bar, said trailing frame including an axle frame, said actuating means including a bracket mounted to said axle frame for pivotal movement about a horizontal axis for coupling said axle frame to said pivot arm, said extension arm including adjusting means for positioning said coupling means lengthwise of said carriage means for changing the ratio of turning radii between said first vertical rotational axis and said coupling means and said second vertical rotational axis of said trailing frame and said coupling means to vary the turning path of said trailing vehicle steerable wheels in response to varying distances of pivotal movement of said coupling means.

4. The vehicle of claim 3, said coupling means including lateral positioning means for setting the pivotal connection laterally of the trailing frame to assure accurate tracking of the steerable wheels behind said main frame.

* * * * *